No. 753,285. PATENTED MAR. 1, 1904.
H. P. MAXIM.
TRACTION STRAP.
APPLICATION FILED AUG. 22, 1903.
NO MODEL.
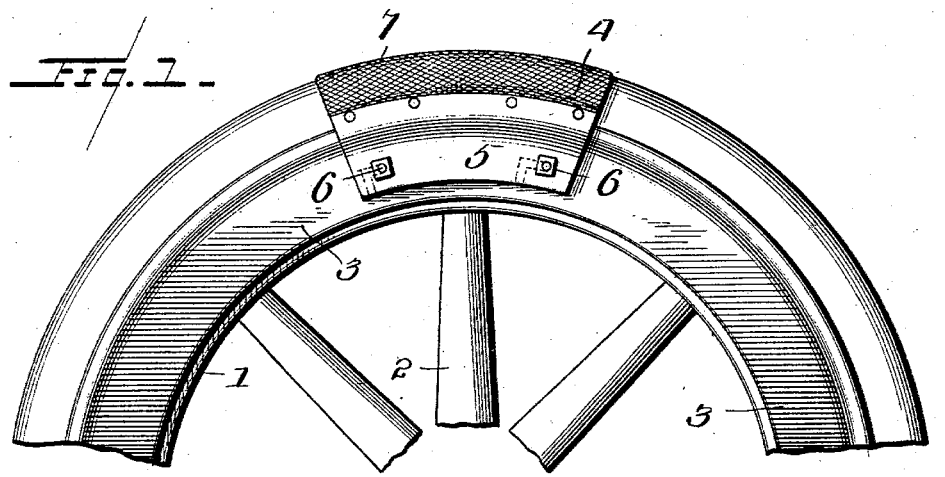
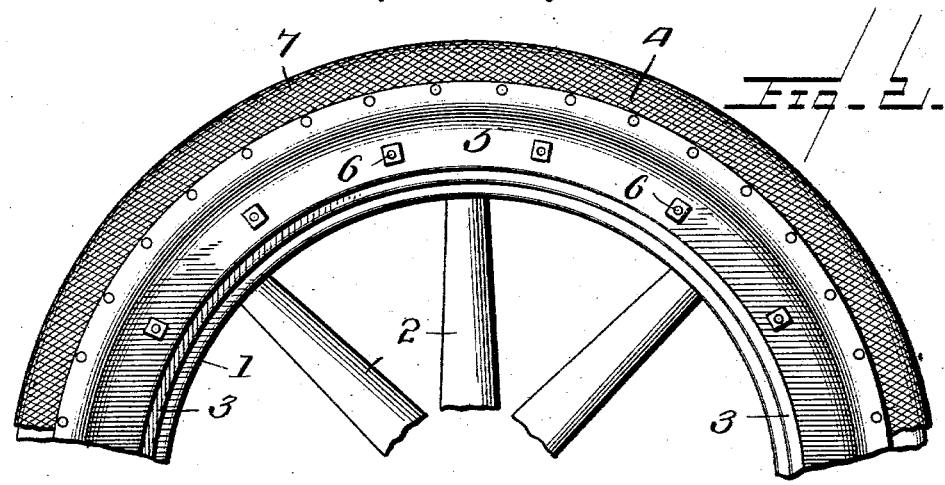
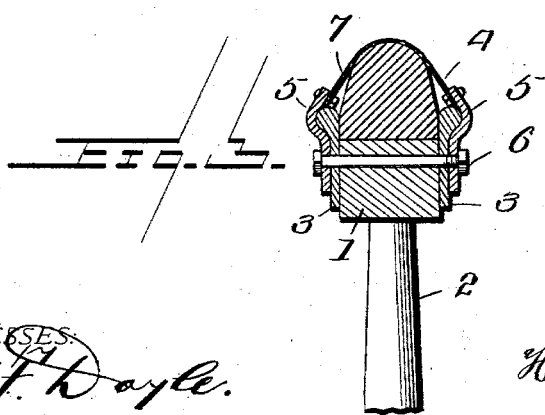
WITNESSES:
W. F. Doyle.
Emma P. Coffin.
INVENTOR
Hiram Percy Maxim.
By Jenkins & Baker,
Attorneys No. 753,285. Patented March 1, 1904.

UNITED STATES PATENT OFFICE.

HIRAM PERCY MAXIM, OF PITTSBURG, PENNSYLVANIA.

TRACTION-STRAP.

SPECIFICATION forming part of Letters Patent No. 753,285, dated March 1, 1904.

Application filed August 22, 1903. Serial No. 170,423. (No model.)

*To all whom it may concern:*

Be it known that I, HIRAM PERCY MAXIM, a citizen of the United States, and a resident of Pittsburg, in the county of Allegheny and State of Pennsylvania, have invented certain new and useful Improvements in Traction-Straps, of which the following is a specification.

The invention relates to devices for increasing the traction between rotary members and a surface upon which said members may be rolled—for instance, between the wheels of a vehicle and the roadway over which the vehicle may be driven. It relates more particularly to the use of such devices when applied to self-propelled vehicles where a maximum traction is imperative.

The object of the invention is to provide a very simple form of traction device which may be readily applied to the wheels of any vehicle and will prevent the slip of the wheels during their driving effect and also any tendency of side slip.

A further object of the invention is to produce a simple form of traction device that may be readily applied to a wheel when conditions demand and adjusted and readily removed from the wheel without interfering in any way with the ordinary tire and parts of the wheel.

Referring to the drawings, Figure 1 illustrates a portion of a wheel with the improved traction-straps applied thereto. Fig. 2 illustrates a wheel with a continuous traction-strap applied to it. Fig. 3 is a cross-sectional view through the tire and traction-strap.

In the use of vehicles, and particularly those which are power-driven in contradistinction to vehicles drawn in the ordinary manner, as by horses, there is a great demand for the maximum amount of traction and gripping effect upon the wheels of the vehicle and surface over which it travels. If the wheels of the vehicle start to slip, an enormous amount of power is consumed without effective results, and it is one of the purposes of this invention to provide a means for effectually stopping the slip of the wheels. As is well known, it is a common practice on self-propelled vehicles to use rubber tires, which give a very strong traction and yet under certain conditions, as upon wet pavements, icy pavements, and in snow, slip to such an extent as to make the vehicles practically inoperative. It has also been the practice to provide cross-bars, which may be strapped onto vehicle-tires of this description; but these should only be used in extreme cases, as they cause great deterioration in the material of the tires and soon cut them out. On the other hand, such devices give a rough-riding action to the vehicle by destroying the continuity of tread of the tires, and while this is not at all disagreeable in riding over snow it becomes intolerable when riding over a hard smooth pavement, where it is sometimes necessary to use devices for increasing the traction on the wheels.

In the accompanying drawings the numeral 1 denotes the felly of a wheel of ordinary construction, provided with the usual spokes 2 and, of course, hub and other parts used in common practice. As shown in the drawings, a rubber tire of the solid type is secured upon the felly 1 by side clamping members 3, and over this is stretched a gripping member 4, which is held in place upon the tread of the tire by side members 5, which may be secured to the sides of the wheel in any desired manner, as by bolts 6, which hold the side clamping members 3 in position. The side members 5 may of course have simply perforations through which the attaching-bolts 6 pass or may be slipped into place by a form of bayonet-lock connection, as indicated in dotted outline, and, in fact, so far as the invention is concerned it is immaterial how the side members 5 of the traction-strap are attached, so long as the strap itself is securely held in place. The body portion 7 of the strap, or that section which passes over the tire, is preferably made of a netting of foraminous substance having a section which, in effect, gives a roughened gripping-surface to the tread of the tire when the strap is in place. This tread portion 7 of the traction-strap may of course be made of any desired material, although it is preferred to use a wire-netting. Such a substance will give the desired increased traction to the vehicle-wheel and absolutely prevent slip of the tire either sidewise or during its rotation. The traction-strap may be applied in section or as a continuous piece extending entirely around the wheel, as illustrated, and whichever form is used it will not cause the depreciation in the tire which results from the use of transverse bars, which are liable to cut into the tire in spots and shorten its life, at the same time giving a very rough-riding tire whenever it comes into contact with smooth hard surfaces.

The traction-strap herein illustrated and described is effective on hard though slippery pavements and will work equally well in snow or on ice, always maintaining smooth-running qualities without injuring the tire. When a tire of the deep sloping type, such as is illustrated herein, is used, very little extra power is used in parting the snow or other substance which overlies a solid bottom, the tire readily cutting through and finding a surface of suitable resistance, which it grips with almost permanent traction.

Obviously the details of the arrangement might be changed without materially affecting the intent or scope of the invention, and obviously numerous changes might be made in the means for securing the strap in position. In fact, instead of using the side members 5, as illustrated, the wire-netting may be secured to the felly in any desired manner.

What I claim as my invention, and desire to secure by Letters Patent, is—

1. In combination with a wheel, a traction-strap removably attached thereto and comprising a tread portion of foraminous formation, clamping members arranged on opposite sides of the wheel-rim and secured to the foraminous tread portion, and locking devices passing through the wheel-rim and clamping members.

2. In combination with a wheel or the like, a traction device removably secured to said wheel and extending over the tread portion of the tire, said traction device being formed as to its tread portion of interwoven material, said material being secured to disk-like plates, and the plates of disk form arranged to be applied to opposite sides of the wheel-rim, and locking devices passing through the wheel-rim and plates.

3. In combination with a wheel or like part having a tire, a removable tread-surface adapted to overlie said tire and formed of interwoven wires, said wires terminating and secured to disk-like plates arranged upon opposite sides of the tire and means for securing said plates against movement.

4. In combination with a wheel or the like, a traction device removably seccured to said wheel extending over the tread portion of the tire, said traction device consisting of a plurality of sections each formed as to their tread portion of interwoven material, said material terminating in, and secured by segmental plates and fastening devices for securing said plates in position on opposite sides of the tire of the wheel.

HIRAM PERCY MAXIM.

Witnesses:
E. P. COFFRIN,
WM. H. BARKER.